Feb. 27, 1951     A. S. HARLAN     2,543,165
OIL FILTER
Filed April 12, 1945     3 Sheets-Sheet 1
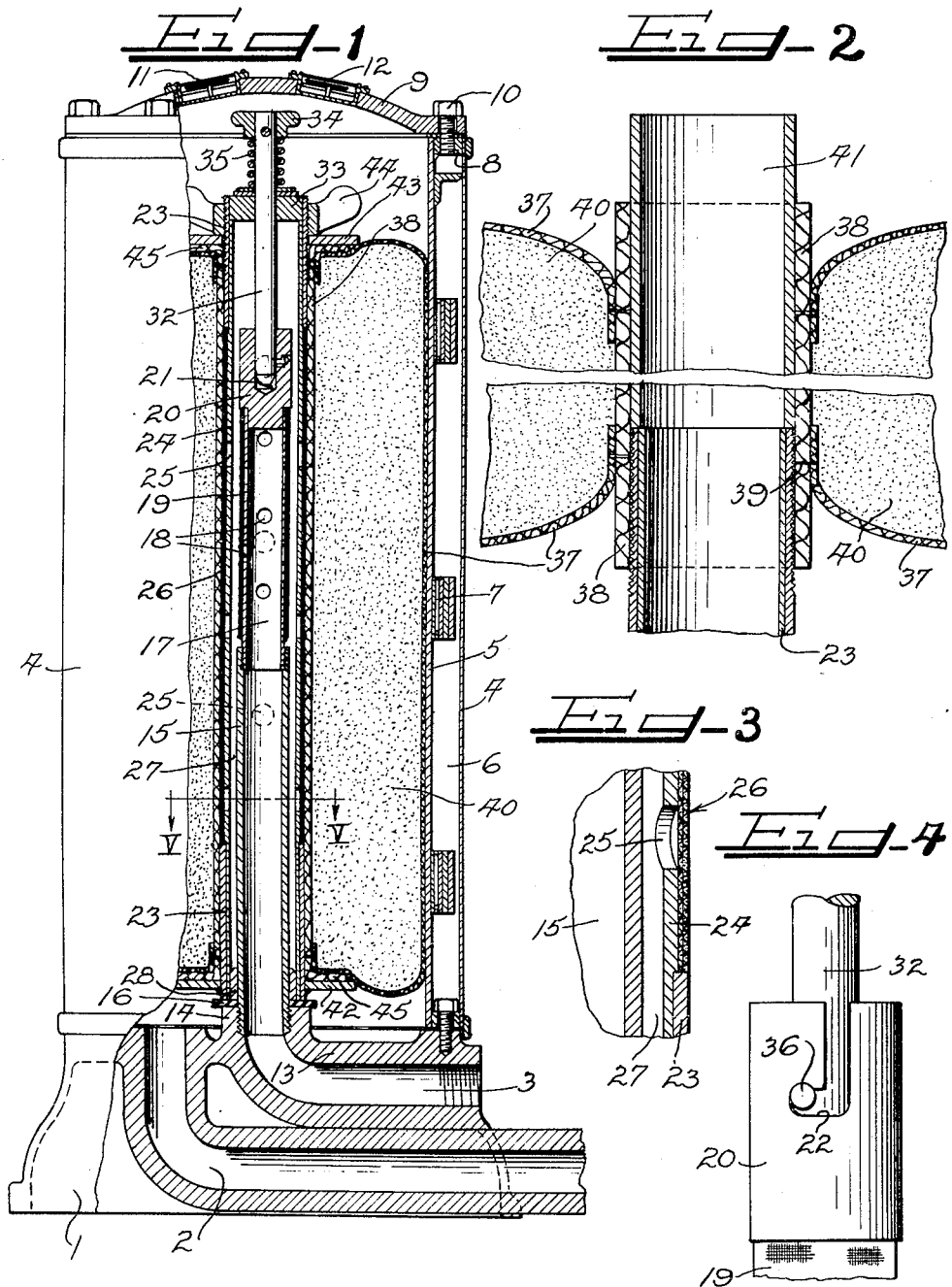
INVENTOR
Avery Stark Harlan
by The Firm of Charles H. Hill
Attys

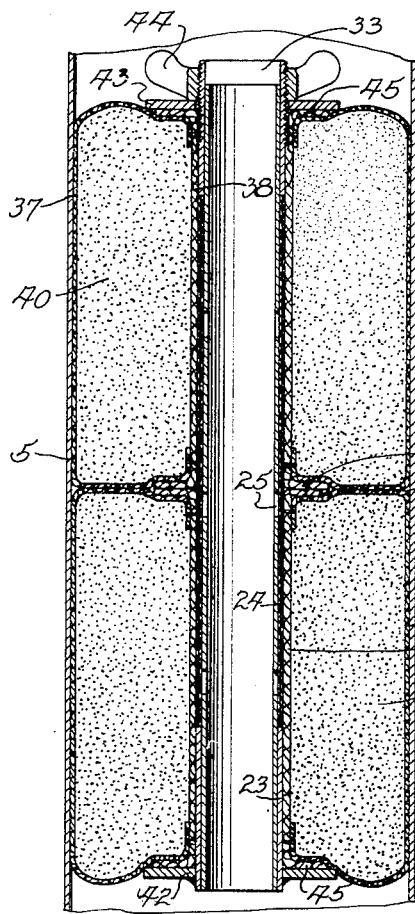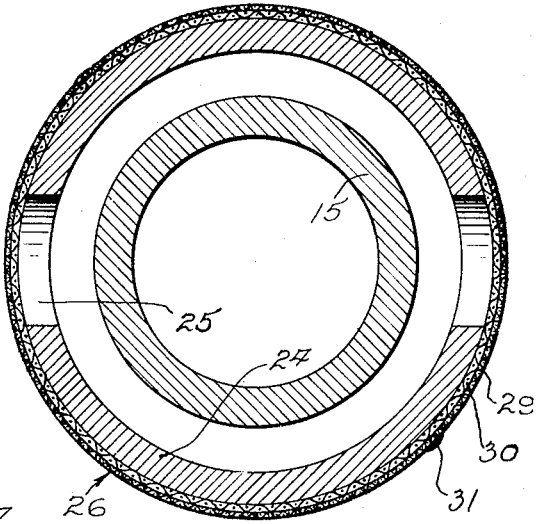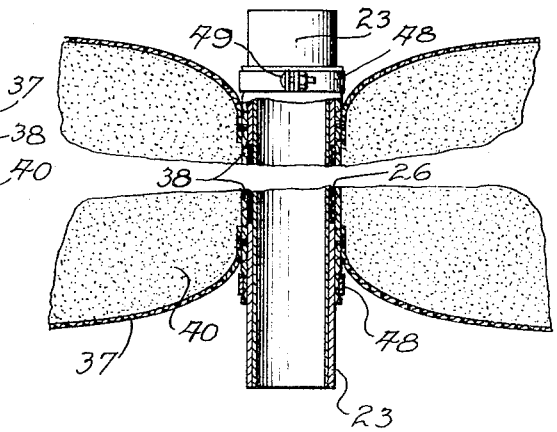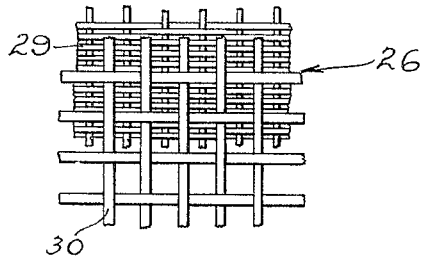

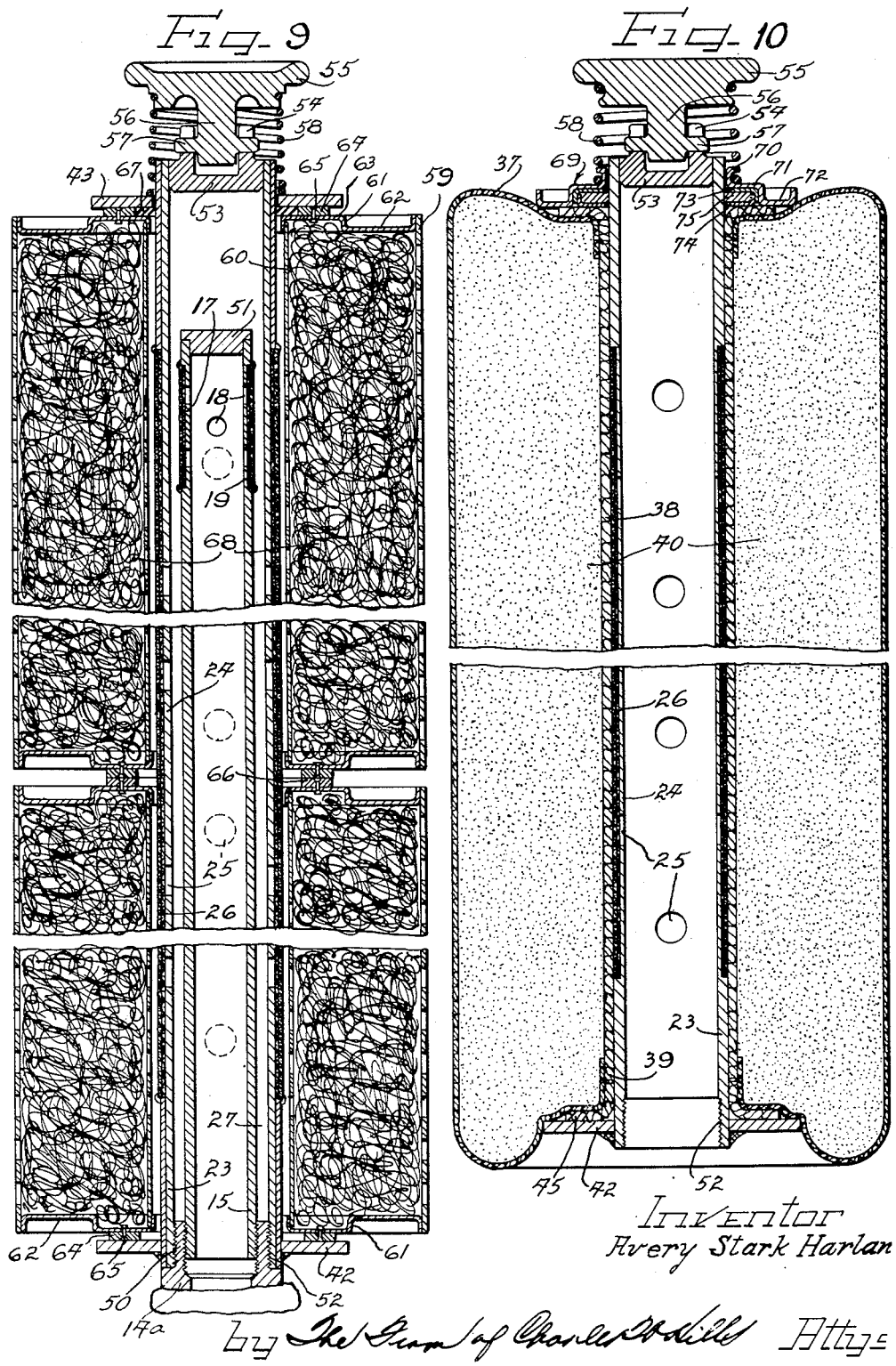

Patented Feb. 27, 1951

2,543,165

UNITED STATES PATENT OFFICE 2,543,165

OIL FILTER

Avery Stark Harlan, Lebanon, Ind., assignor to Honan-Crane Corporation, Lebanon, Ind., a corporation of Indiana Application April 12, 1945, Serial No. 587,841

8 Claims. (Cl. 210—131)

This invention relates to improvements in an oil filter, and more particularly to an oil filter highly desirable for use in connection with the filtering of lubricating oil for internal combustion engines and other mechanical apparatus, although the invention may be used in connection with the filtering of other liquids, as will be apparent to one skilled in the art.

The instant invention is an improvement upon that disclosed, described and claimed in the Harlan et al. Patent No. 2,153,062 issued April 4, 1939.

For purposes of clarity, the instant invention will be set forth herein and described in connection with the filtering of oil, such as lubricating oil, fuel oil, etc. The filtering of the oil is a continuous process; that is, all the time the mechanism being supplied with clean oil is in operation, oil is steadily traveling through the filter.

When it is necessary to replace the specific filter medium within the filter casing, it is necessary to shut down the operation of the apparatus being supplied with oil, or else by the use of suitable valves to isolate the oil filter from the rest of the system. In many instances, it is extremely important to spend as little time as possible in changing the filter medium, and in assembling, dismantling, and reassembling salient parts of the structure. At the same time, it is highly desirable to have a filtering arrangement that approaches one hundred percent efficiency within a negligible amount.

With the foregoing thoughts in mind, it is an object of the instant invention to provide an oil filter structure having a very high efficiency, and which has a large capacity in comparison with the overall size of the structure.

Another object of the instant invention is the provision of an oil filtering device utilizing a filter element in the nature of a cartridge, with provisions being made for the very rapid and easy removal and replacement of cartridges.

Still another feature of the instant invention resides in the provision of an oil filtering device into which a filtering cartridge may be quickly and easily inserted, and the structure includes simply operable holding or clamping means to lock the cartridge in position within the filter housing.

A further feature of the instant invention resides in the provision of an oil filtering device in which the filtering material is finely comminuted, such as fuller's earth for example, and the filtering material is carried in removable and replaceable cartridges, the device being so constructed that the cartridges may be removed and replaced in a minimum amount of time and with a minimum amount of labor, and with no danger of the comminuted filtering material being carried through the outlet with the filtrate.

Still another object of the instant invention is the provision of a filtering device in which a filter cartridge may be firmly positioned within the casing or released for removal by the simple actuation of a bayonet slot connection.

It is also an object of the instant invention to provide a filtering device in which one or more filtering cartridges may be used and the operation for a plurality of cartridges is substantially the same as the operation necessary to install only a single cartridge, the structure being such that a plurality of cartridges are automatically sealed at the meeting places therebetween.

A further feature of the invention resides in the provision of a novel and simply handled filter cartridge, especially constructed to facilitate positive joining with a core tube or other supporting structure.

Another object of this invention is the provision of an oil filter or filtering device in which a single cartridge or a stack of cartridges containing filter media are used, and wherein the construction is such as to apply a constant and continuing pressure on the cartridge or stack of cartridges, which compensates for any settling of shrinking of a cartridge that might occur during use, and thus maintains the filtering device operating continuously, satisfactorily and efficiently.

Also an object of this invention is the provision of a filtering device utilizing a cartridge or a plurality of cartridges in which cartridges of various materials and containing various filter media may be utilized without making any adjustments or changes in the construction of the filtering device per se.

Still another object of the instant invention is the provision of a filtering device accommodating a cartridge or stack of cartridges, and wherein the cartridges may be of somewhat flexible or yielding construction such as a fabric bag containing a filter media, or the cartridges may be in the form of metallic casings containing a filter media as may be desired, the same general filter construction operating equally as well with either type of cartridge.

As will be more apparent from the disclosures later herein, the instant invention embodies many salient structural details all designed to increase the efficiency of the filtering device, render the device both economical to manufacture and use, and to facilitate and expedite the ease with which used cartridges may be removed and new cartridges replaced in the casing. At the same time these details of construction have been so designed and arranged as to permit ready sealing of component parts where necessary, and to aid materially in the prevention of any of the filter medium proper being carried out with the filtrate, whereby an exceptionally finely comminuted filtering medium may be employed.

While some of the more salient features, characteristics and advantages of the instant invention have been above pointed out, others will become apparent from the following disclosures, taken in conjunction with the accompanying drawings, in which:

Figure 1 is a fragmentary part elevational part vertical sectional view of a liquid filtering device embodying principles of the instant invention;

Figure 2 is an enlarged fragmentary central vertical sectional view, somewhat diagrammatic in character, illustrating an early operation in the mounting of a filter cartridge;

Figure 3 is a fragmentary enlarged sectional view detailing the construction of the core tube, and taken substantially in the vicinity of the section line V—V of Figure 1;

Figure 4 is an enlarged fragmentary elevational view illustrating the specific locking arrangement between the outlet tube and the core tube in the filter element;

Figure 5 is an enlarged plan sectional view taken substantially as indicated by the line V—V of Figure 1, looking in the direction of the arrows;

Figure 6 is an enlarged fragmentary central vertical sectional view, similar in character to Figure 1, but with parts omitted, illustrating the use of a plurality of cartridges at the same time;

Figure 7 is an enlarged fragmentary elevational detailed showing of the screening means used in connection with both the outlet tube and the core tube;

Figure 8 is an enlarged fragmentary vertical sectional view illustrating a somewhat different form of construction of the filter element, this view being mainly directed to a different method of uniting the filter cartridge and the core tube;

Figure 9 is a fragmentary central vertical sectional view through a filtering device embodying principles of this invention, similar in character to Figure 1, but illustrating a different arrangement for anchoring the core tube within the casing, showing that a different type of filter cartridge may be used, and showing a somewhat different arrangement for holding a cartridge in position; and Figure 10 is a view similar in character to Figure 9, but illustrating the core tube structure of Figure 9 in association with a different type of filter cartridge, and illustrating a somewhat different flange construction for use at the top of the cartridge.

As shown on the drawings:

In the illustrated embodiment of the instant invention, referring more particularly to Figure 1, an oil filter is illustrated including a base construction 1. Inside this base construction suitable partitions are provided to form an inlet conduit 2, and an outlet conduit 3 for filtrate. Suitably mounted upon the base is an external housing 4. An internal housing 5 is disposed concentrically with the external housing, but spaced therefrom to provide an open space 6 therebetween. If so desired, the space 6 may be filled with insulating material, or dead air within the space may be relied upon as an insulating medium. There is preferably some heating means within the space 6, and in the illustrated instance, these heating means are shown in the form of a plurality of electrical heating elements 7 surrounding the inside housing 5. For the proper filtration of a liquid such as oil, both pressure and temperature are necessary. The heating elements 7 may provide temperature to the desired degree inside the inner housing 5, and the pressure of the entering oil may be provided by any suitable pumping means, not shown in the drawings. The two housings 4 and 5 may be bonded together so as to form in effect a single construction by connecting rings 8 or in any other equivalent manner, and the composite structure may be bolted to the base or otherwise secured thereto.

A removable cover 9 is provided over the top of the housing and may be bolted to the side wall construction as indicated at 10, or otherwise removably secured thereto. The cover preferably includes a temperature indicator 11, and a pressure indicator 12, these particular structures being shown diagrammatically in the drawing. In the event the entire filter structure is too large to render the temperature and pressure gauges easily visible when mounted in the cover, these gauges may be mounted at any other suitable location.

The bottom construction inside the base 1 is preferably formed so as to provide a closed floor 13. Inlet conduit 2 extends through this floor to admit liquid to be filtered. The outlet conduit 3 also extends through the floor, preferably centrally thereof, and around the outlet opening a boss 14 projects above the general level of the floor. This boss is internally threaded to receive therein the lower threaded end of an upright outlet tube 15 which extends centrally upwardly well within the casing. Around the lower end of the outlet tube a gasket 16 is seated on the upper face of the boss 14.

The outlet tube 15 is so fabricated as to provide an upper portion 17 of reduced diameter. This portion 17 is provided with a plurality of perforations 18 through the wall thereof, and the perforated area of the tube is preferably covered by suitable screening means 19, later more fully described, which is preferably of a thickness to substantially make up for the reduced diameter of the section 17 so that the entire outlet tube construction is substantially of uniform outside diameter. The upper end of the outlet tube is closed by a plug 20 preferably brazed to the top of the tube. This plug has a centrally disposed core or socket 21 therein which is in communication with a bayonet slot formation 22 in the plug, as seen clearly in Figure 4.

For concentric or telescopic disposition around the outlet tube 15 a core tube 23 is provided, and this core tube is also fabricated in a manner to provide an intermediate portion 24 of reduced diameter. This portion of reduced diameter is provided with a plurality of openings or perforations 25 through the wall thereof, and this same portion including the openings is covered by screening means generally indicated by numeral 26, as seen more clearly in Figure 3. The core tube is of such diameter as to provide an oil accumulation space 27 between itself and the outlet tube 15, this space being closed at the bottom by a suitable cylindrical guide plug 28 (Figure 1) preferably brazed or otherwise secured to the outlet tube, and having a beveled upper edge to facilitate easy disposition of the core tube around the outlet tube.

With reference more particularly to Figure 7, it will be seen that the screen structures 19 on the outlet tube and 26 on the core tube, which structures are identical, include an outer very fine screen 29 and an inner relatively coarse screen 30. The showing in Figure 7 is very greatly exaggerated for purposes of clarity. In fact, the outer screen 29 is preferably so fine as to be opaque to the eye. That is, if this screen is held up before the eye, one cannot see through it, nor is any light admitted through the interstices of the screen. The screen is of such fineness as to pass the oil or liquid being filtered, but not to pass even very small solid particles. The inner screen is made more coarse to provide a flow space between the outer screen and the reduced portion of the core or outlet tube as the case may be. The apertures in both the core and outlet tubes are spaced apart, and so the flow space provided by the coarser inner screen permits the fluid to travel along the outer wall of the respective tubes until it finds the nearest aperture. In applying the screens, they are wrapped tightly around the reduced portion of the respective tube, and then the adjacent edges may be brazed, welded, or otherwise secured together as indicated at 31 in Figure 5 so as to insure a substantially permanent mounting of the screen arrangement on each of the tubes.

In connection with the instant invention I have provided a holding or clamping mechanism that may be extremely simply and rapidly operated to hold or clamp the core tube 23 in position within the casing or housing. With reference more particularly to Figures 1 and 4, it will be seen that these clamping means include a rod or shank 32 slidable through a central opening in a plug 33 freely seated in the upper end of the core tube 23. It will be seen that adjacent the plug 33, the fabricated core tube is so constructed as to provide an inside shoulder limiting the inward movement of the plug. The upper and outer end of the rod 32 is provided with a knob or handle 34 and between the knob and the plug 33 a coil spring 35 is disposed around the rod. The lower end of the rod, as best seen in Figure 4, is provided with an outstanding pin or detent 36 for engagement in the bayonet slot 22 of the plug 20.

When the core tube is placed in position within the filter housing, and the plug 33 is placed in the top of the core tube, the handle 34 is taken in the hand, forced downwardly against the action of the spring 35, and turned to lock the pin 36 in the bayonet slot 22, and hold the parts clamped together. In this manner, the action of the spring 35 forces the core tube downwardly into a positive sealing engagement with the aforesaid gasket 16 on the boss 14 at the bottom of the casing. To release the core tube, it is a simple expedient to press downward upon the handle 34, and rotate it a partial revolution in the reverse direction.

The core tube 23 forms a removable part of a filter unit. In the illustrated embodiment of the invention, seen in Figures 1 to 5, inclusive, the remainder of the filter unit includes a bag in the form of a hollow or double walled cylinder containing a filter medium. This bag may comprise an integral outer side, top and bottom closure 37 of some suitable fabric such as canvas that is permeable to liquids, but much less permeable to solids. The central opening for the accommodation of the core tube is defined by a liquid pervious tube 38 which is substantially impervious to solids. This tube may be made satisfactorily of felt, or some other suitable or equivalent material. As seen best in Figure 2, portions of the canvas bag 37 may be secured to the felt tube as by stitching 39, and also from the showing in this figure it will be noted that the felt tube projects in both directions beyond the ends of the canvas part. The bag thus constructed from the parts 37 and 38 contains a filter medium 40 of any suitable material. A highly satisfactory material is a very fine or highly comminuted or triturated fuller's earth, infusorial or diatomaceous earth. Depending upon the particular filtering problem involved, other materials may be used. It will be noted from the foregoing that the baglike arrangement comprising the parts 37 and 38 together with the filter medium 40 therein forms a cartridge which may readily be inserted into the filter housing, and as readily removed therefrom after usage.

The cartridge is initially made up, as seen in Figure 2, with an inside core 41 which may be of paper or fiber board or some other equally economical material. When the core tube and cartridge are joined to form the composite filter unit, it is a simple expedient to remove the core tube bodily from the filter housing. Then, as exemplified by the showing in Figure 2, the cartridge may be laid down, held in position, and the core tube 23 pressed inside of the tubular portion 38 of the cartridge. As the core tube is pressed in, the temporary core 41 is forced out of the opposite end, and this temporary core is then discarded. With reference now to Figure 1 it will be seen that the core tube is provided at its lower end with a fixed radially outwardly extending flange 42 welded or equivalently secured to the core tube. This provides a definite abutment for the ultimately lower end of the cartridge. After the core tube has been inserted in the cartridge in the manner above described, until the flange 42 abuts the cartridge, a similar flange 43 may be loosely placed around the upper end of the core tube. A suitable wing nut 44 may then be screwed down over the threaded outside face of the upper end of the core tube to positively clamp the filter cartridge between the flanges 42 and 43. Thus, when in service, the core tube supports the filter cartridge. When the cartridge is mounted around the core tube, the extended portions of the tubular portion 38 of the cartridge will be turned outwardly adjacent the flanges 42 and 43 as indicated at 45 in Figure 1 to effect a sealing of the cartridge relatively to the ends of the core tube.

When the filter is first set up for operation, the cover 9 is removed from the housing or casing, the core tube is also removed from the housing and exteriorly thereof inserted in the filter cartridge to form the composite filter unit. This filter unit is then placed into the filter casing with the lower projecting end of the core tube seating upon the gasket 16. Following that operation, it is a simple expedient to place the plug 33 in the upper end of the core tube, force the rod 32 downwardly into engagement with the bayonet slot 22, replace and secure the cover 9, and the device is ready for operation. In operation, liquid to be filtered is pumped through the inlet 2 entering the bottom of the housing inside the wall 5 and below the filter cartridge. This liquid then permeates through the canvas covering 37 of the cartridge, through the filter medium 40 therein, through the tubular portion 38 of the cartridge, the screen element 26 on the core tube, the apertures 25 in the core tube, to the space 27 between the core tube and the outlet tube. The liquid finds its way along this space and passes through the screen structure 19 on the outlet tube and thence through the openings 18, descending through the outlet tube and the outlet passageway 3 in the form of clean filtrate. It will be noted that when the cartridge is placed in position within the casing, the outer fabric portion 37 of the cartridge intimately hugs the inside casing wall 5 so that all liquids must pass through the filter cartridge. In addition, it will be specially noted that the two screen structures 19 and 26, above described, together with solid impervious tube 38 of the cartridge effectively prevent any carry-over by the filtrate of any portion of the filter medium, regardless of how fine that medium may be. In reality, with the use of a very fine filtering medium, the screen structures 19 and 26 have the more important function of preventing passage of the filter medium rather than the passage of dirt particles contaminating the liquid to be filtered.

During operation, the pressure and temperature of the liquid passing through the filter is maintained as nearly optimum as possible depending upon the particular type of oil or other liquid being filtered, and upon the particular filter medium used, as well as upon the capacity desired. Working pressures will vary usually from 30 to 60 pounds, and temperatures will vary usually from 130° to 165° F., a satisfactory operating temperature being between 130° and 140°. The gauges 11 and 12 on the cover of the filter housing render it easy to maintain the proper working pressure and temperature.

After the filter cartridge has had its usefulness impaired too greatly by collected impurities, which fact may be determined generally from the pressure gauge, it is a simple expedient to remove the cover 9, remove the wing nut 44, flange 43, and then withdraw the filter cartridge itself from the casing, leaving the core tube within the casing. After the cartridge has been withdrawn and discarded, it is a simple expedient to release the rod 32 and remove the core tube, insert this core tube in a new cartridge, and then replace the apparatus as above described.

In Figure 6 I have illustrated a slightly different form of construction. In this case, more than one cartridge is used in the filter housing at a time. In certain instances, it may be desirable to have cartridges all of the same size for convenience in storage and handling, while the filters the cartridges are to be used in may be of various sizes. In that event, it is a simple expedient to use two cartridges, or more, in the same filter. Figure 6 shows the use of two small size cartridges in lieu of the larger cartridge seen in Figure 1. The smaller cartridges are identical in construction with the larger cartridges and are handled in the same way. When the two cartridges are caught between the flanges 42 and 43 associated with the core tube it will be seen that the confronting ends of the cartridges are pressed together in sealing engagement as indicated at 46, and the extensions of the inside tubes 38 of the cartridges are turned outwardly in confronting relationship as indicated at 47. Thus, there is a positive sealing engagement between adjacent ends of the respective cartridges, and it is impossible for the liquid to be filtered not to pass through the filter medium within the cartridges.

In Figure 8 I have shown a different form of construction for the connection between the cartridge and the core tube 23. In this instance, the flanges 42 and 43 associated with the core tube are eliminated, and when the core tube is rammed through the tubular portion 38 of the cartridge, the projecting part of the tube 38 may be clamped around the core tube by a clamping arrangement 48. A suitable form of clamping arrangement is a split ring with bolt and nut tightening means 49 to insure a positive sealing between the cartridge and the core tube.

In Figure 9, I have illustrated a slightly different construction for the center or outlet tube 15, and a different mounting and top end construction for the core tube 23. In this instance, a boss 14a is provided around the outlet openings in the base construction, but instead of this boss being interiorly threaded as above described in connection with the boss 14, the boss is preferably provided with an integral bushing 50 which is both internally and externally threaded.

The center or outlet tube 15 is threadedly engaged interiorly of the boss 14a in the same manner above described. The center tube 15 is also substantially of the same construction as above described, including the reduced upper portion 17 having a number of apertures 18, and enclosed by the screen means generally indicated at 19. However, in the case of Figures 9 and 10, the upper end of the center tube is preferably closed by a plain plug 51.

In this instance, the lower end of the core tube 23 is provided with internal threads as indicated at 52 for threaded engagement with the outside of the bushing 50. With this arrangement, the core tube 23 may be substantially permanently mounted within the filter housing, if so desired, although the tube may be removed when desired by merely unscrewing it from the bushing. The core tube is of substantially the same construction as above described, including the outstanding radial flange 42 welded or equivalently secured near the lower end of the tube. The side walls of the tube are reduced as indicated at 24, provided with the apertures 25, and that portion of the tube is covered with the screen means generally indicated at 26. The aforesaid cylindrical guide plug 28, is not necessary in this instance, however, because the bushing 50 provides the oil accumulation space 27 between the core tube and the center or outlet tube. The upper end of the core tube is closed with a solid plug 53, that is, a plug having no central aperture therethrough, and this plug 53 is provided with a bayonet slot arrangement as indicated at 54. A hand operable knob 55 provided with a shank 56 having projections 57 thereon for engagement in the bayonet slot arrangement 54 is provided to effect a continuous downward pressure by virtue of a spring 58 carried by the plug. In the instance of Figure 9, the lower end of this spring abuts the aforesaid floating flange 43 disposed around the core tube.

As before, the floating flange 43 bears against the filter cartridge or cartridges to hold those cartridges firmly in position around the core tube between the flanges 42 and 43. With the arrangement of Figure 9, however, a continuous downward pressure is exerted upon the filter cartridges, such downward pressure compensating for any settling or shrinking that might occur in the cartridges during use of the filtering device.

In Figure 9, I have illustrated a different form of cartridge, and it will be understood that the cartridges of Figure 9 may equally as well be used with the general filter construction of Figure 1 as well as with that construction just above described in connection with Figure 9. In this instance, however, I have illustrated the use of filter cartridges in the form of metallic casings. Each cartridge includes an outer perforated cylindrical wall 59, an inner perforated wall 60 and an imperforate plug at each end between the walls 59 and 60. Each imperforate end is of the same construction, so that the cartridge may be placed in the filter housing with either end down. The end wall generally indicated by numeral 61 is preferably shaped to provide an outer channel portion 62 and an inner annular plateau 63. The plateau 63 carries an annular gasket 64 thereon preferably secured in place by one or more rivets 65. The gasket at one end of a cartridge will seat against the permanently mounted flange 42 and thus effect a seal at that point. If only one cartridge is used, the gasket on the other end thereof will seat against the floating flange 43 and effect a seal at that point. Where more than one cartridge is used in the same filter housing, it will be seen that the gaskets 64 abut each other between cartridges as indicated at 66 so that there is a positive seal between adjacent cartridges. With this arrangement it is also preferable to provide an annular gasket 67 inside the floating flange 43 at the top of the core tube. The gasket 67 may lie inside the gasket 64 carried by the filter cartridge when the parts are in operative association, and thus effect a positive seal at the top of the core tube so that no liquid passing through the filter cartridges will escape around the upper end of the core tube. The cartridges themselves may be filled with any suitable form of filter medium as indicated at 68.

In operation, it is a simple expedient to mount the core tube by threadedly engaging it with the bushing 50. Then the cartridges may be placed in the filter housing by inserting them over the core tube. After this is done, the gasket 67 may be placed in position, a floating flange 43 placed thereover, and the knob 55 with its shank 56 engaged with the bayonet slot arrangement 54 in the plug at the top of the center tube. The engagement of the knob with the plug puts the spring 52 under compression so that during operation there will be a continuous and constant axial pressure upon the filter cartridge or stack of cartridges, as the case may be. The cover 9 may then be placed upon the housing in the manner above described, and the filtering device is ready for use. When it is desired to change cartridges, it is a simple expedient to remove the cover 9, release the knob 55, and draw the cartridges out of the filter housing, leaving the core tube 23 to remain within the housing.

Where metal filter cartridges are used, of the character shown in Figure 9, these cartridges preferably are so sized as to leave a space all around the cartridges between the outer perforate walls of the cartridges and the internal housing 5 of the casing construction.

In Figure 10, I have illustrated the use of a filter cartridge of the character above described in connection with Figure 1 with the core tube assembly of Figure 9. The structure of Figure 10 operates in the same way as the structure of Figure 9. The only difference resides in the provision of a gasket holding flange at the top of the core tube which may be substituted for the floating flange 43 and the gasket 67. This flange which is generally indicated by numeral 69 embodies an upstanding portion shaped to define an outer channel as indicated at 70 and the lower coil of the spring 58 is engaged in that channel so that when the hand knob 55 is removed it carries both the spring and the flange 69 therewith. The flange 69 also has a laterally extending substantially flat portion 71 which terminates in an outer channel formation 72. On the underside of the flat portion 71 a pair of oppositely disposed gasket holding rings 73 and 74 may be secured together and to the flange by tack welding or an equivalent operation. The gasket holding rings carry therebetween a gasket 75 for intimate edgewise contact with the upper part of the core tube 23 to prevent any escape of fluid along the upper outer face of the core tube. Obviously, the gasket holding flange construction may be substituted for that construction including the floating flange 43 and the gasket 67 of Figure 9.

It should be borne in mind that the structures illustrated in Figures 9 and 10 of the drawings may be substituted for the corresponding structure illustrated in Figure 1, and vice versa. It will be understood that the core tube having the lower threaded end 52 may be engaged with the filter cartridge outside of the filter housing if so desired, but with a core tube of that character, it is a more simple expedient to first place the core tube in the housing and then drop the cartridge in around the core tube. Obviously, with any of the different outlet and core tube arrangements one or more filter cartridges may be used, and these cartridges may be of the fabric bag type or of the rigid casing type.

From the foregoing, it is apparent that I have provided a novel filter structure involving the use of filter cartridges and providing an arrangement by means of which the cartridges may be readily placed in the filter casing, and as readily removed therefrom with a minimum of time and labor involved in the operation. It will also be appreciated that the filter structure is highly efficient, and that all parts with the exception of the cartridges themselves are extremely durable and long lived. It will also be apparent that the entire structure is economical to manufacture and use.

It will, of course, be understood that various details of construction may be varied through a wide range without departing from the principles of this invention and it is, therefore, not the purpose to limit the patent granted hereon othewise than necessitated by the scope of the appended claims.

I claim as my invention:

1. In an oil filter, a casing, an outlet tube projecting freely into said casing and having an opening in its side wall, said casing having an inlet separated from the outlet tube, a gasket around the base portion of said tube, a core tube concentrically associated with said outlet tube and having an opening in its side wall, a plug having a bayonet slot therein closing the inner end of said outlet tube, a plug closing the adjacent end of said core tube, a headed plunger extending through the core tube plug and having means to lock in the bayonet slot in said outlet tube plug, a spring between the head of the plunger and the core tube plug to force said core tube into sealing engagement with said gasket, and a liquid pervious filter unit around said core tube.

2. In combination in an oil filter, a casing having an inlet opening, an outlet tube extending freely into the interior of said casing, a core tube for concentric disposition over said outlet tube, said core tube having one portion of its wall of lesser thickness than the remainder and perforations through said portion, screening means over said perforations of such size as to make said core tube of substantially uniform size throughout, and a filter element having a longitudinal opening therethrough for the removable reception of said core tube.

3. In combination in an oil filter, a casing having an inlet opening, an outlet tube extending freely into the interior of said casing, a core tube for concentric disposition over said outlet tube, means closing the upper ends of each of said tubes, each tube having a wall portion of reduced thickness and perforations through said portion, screen means over said perforations and of a size to make up the reduction in wall thickness, and a filter cartridge having an opening therethrough for the removable reception of said core tube.

4. In an oil filter, a casing having an inlet opening for liquid to be filtered and an outlet opening for filtrate, a core tube in said casing with its interior in communication with said outlet opening, said core tube having an opening through its wall, spaced flanges around said core tube, a plurality of filter cartridges around said core tube, means to move one of said flanges relatively to the other to clamp said cartridges in position, each of said cartridges including a fabric bag filled with a filter medium, and a fabric tube defining an opening through the cartridge and extending therebeyond, the protruding fabric tube portions being outwardly turned and pressed together between cartridges and between the respective flange and bag at the flange ends of the core tube.

5. In an oil filter, a casing having separated inlet and outlet openings, a perforated core tube in said casing with its interior communicating with the outlet opening, filter cartridge means around said core tube, a plug fixed in the end of said core tube, a hand operable element removably engageable with said plug, and resilient means between said element and said filter means to exert constant pressure on the latter when said element is engaged with said plug.

6. In an oil filter, a casing having separated inlet and outlet openings, a perforated core tube in said casing with its interior communicating with the outlet opening, filter cartridge means around said core tube, a plug secured in the end of said tube and having a bayonet slot therein, a hand operable knob with a shank engageable in said bayonet slot, and spring means around said shank to exert constant pressure on said filter cartridge means.

7. In an oil filter, a casing having separated inlet and outlet openings, a perforated core tube in said casing with its interior communicating with the outlet opening, filter cartridge means around said core tube, a plug secured in the end of said tube, a hand knob including a shank removably engageable with said plug, spring means around said shank to exert constant pressure on said filter cartridge means, and a pressure applying flange carried by said spring means.

8. In an oil filter, a casing having separated inlet and outlet openings, a perforated core tube in said casing with its interior communicating with the outlet opening, filter cartridge means around said core tube, a plug secured in the end of said tube, a hand knob including a shank removably engageable with said plug, spring means around said shank to exert constant pressure on said filter cartridge means, and a pressure applying flange carried by said spring means, and a gasket holder carried by said flange holding a gasket for liquid tight contact around said core tube.

AVERY STARK HARLAN.

REFERENCES CITED

The following references are of record in the file of this patent:

UNITED STATES PATENTS

| Number | Name | Date |
|---|---|---|
| 730,485 | Simoneton | June 9, 1903 |
| 1,788,510 | Everson | Jan. 13, 1931 |
| 2,027,406 | Pennebaker | Jan. 14, 1936 |
| 2,027,876 | Pennebaker | Jan. 14, 1936 |
| 2,076,935 | Burckhalter | Apr. 13, 1937 |
| 2,082,322 | Brundage | June 1, 1937 |
| 2,153,062 | Harlan et al. | Apr. 4, 1939 |
| 2,158,512 | Layte et al. | May 16, 1939 |
| 2,173,978 | Pennebaker | Sept. 26, 1939 |
| 2,201,410 | Williams et al. | May 21, 1940 |
| 2,211,305 | Werder | Aug. 13, 1940 |
| 2,218,339 | Manning | Oct. 15, 1940 |
| 2,287,526 | Krogman | June 23, 1942 |
| 2,314,640 | Winslow et al. | Mar. 23, 1943 |
| 2,325,399 | Houston | July 27, 1943 |
| 2,335,532 | Ream | Nov. 30, 1943 |
| 2,345,849 | Winslow et al. | Apr. 4, 1944 |
| 2,347,384 | Winslow et al. | Apr. 25, 1944 |
| 2,364,617 | Bolser | Dec. 12, 1944 |
| 2,367,745 | Wicks | Jan. 23, 1945 |
| 2,429,321 | La Breque | Oct. 21, 1947 |
| 2,435,510 | Rabjohn | Feb. 3, 1948 |